(12) United States Patent
Sekimoto

(10) Patent No.: US 9,723,211 B2
(45) Date of Patent: Aug. 1, 2017

(54) CAMERA MODULE WITH IMAGE STABILIZATION BY MOVING IMAGING LENS

(71) Applicant: Sharp Kabushiki Kaisha, Sakai-shi, Osaka (JP)

(72) Inventor: Yoshihiro Sekimoto, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 15/110,157

(22) PCT Filed: Nov. 21, 2014

(86) PCT No.: PCT/JP2014/080918
§ 371 (c)(1),
(2) Date: Jul. 7, 2016

(87) PCT Pub. No.: WO2015/104908
PCT Pub. Date: Jul. 16, 2015

(65) Prior Publication Data
US 2016/0330375 A1    Nov. 10, 2016

(30) Foreign Application Priority Data
Jan. 10, 2014 (JP) ................. 2014-003735

(51) Int. Cl.
H04N 5/232 (2006.01)
G03B 5/00 (2006.01)
(Continued)

(52) U.S. Cl.
CPC .......... *H04N 5/23287* (2013.01); *G02B 7/08* (2013.01); *G02B 7/09* (2013.01); *G02B 13/001* (2013.01);
(Continued)

(58) Field of Classification Search
CPC .... H04N 5/3745; H04N 5/3577; H04N 5/361; H04N 5/378; H01L 27/14603;
(Continued)

(56) References Cited

U.S. PATENT DOCUMENTS

2011/0176046 A1  7/2011  Hu et al.
2013/0039640 A1  2/2013  Sekimoto
(Continued)

FOREIGN PATENT DOCUMENTS

JP    2006-078881 A    3/2006
JP    2011-128583 A    6/2011
(Continued)

OTHER PUBLICATIONS

Official Communication issued in International Patent Application No. PCT/JP2014/080918, mailed on Dec. 22, 2014.

*Primary Examiner* — Tuan Ho
(74) *Attorney, Agent, or Firm* — Keating & Bennett, LLP

(57) ABSTRACT

In a camera module having an image stabilization mechanism, both of miniaturization and thinning are achieved, while adopting a structure of driving an entire of a lens group in a direction perpendicular to an optical axis direction. An image stabilization portion (4) of a camera module (50) includes an OIS base (14), an OIS movable plate (12), and guide balls (15) which support the OIS movable plate (12) so as to be movable in a plane perpendicular to an optical axis direction with respect to the OIS base (14).

6 Claims, 8 Drawing Sheets

(51) Int. Cl.

| | |
|---|---|
| *H04N 5/225* | (2006.01) |
| *G02B 7/08* | (2006.01) |
| *G02B 27/64* | (2006.01) |
| *H02K 41/035* | (2006.01) |
| *G02B 7/09* | (2006.01) |
| *G02B 13/00* | (2006.01) |

(52) U.S. Cl.
CPC ............. *G02B 27/646* (2013.01); *G03B 5/00* (2013.01); *H02K 41/0356* (2013.01); *H04N 5/2252* (2013.01); *H04N 5/2253* (2013.01); *H04N 5/2254* (2013.01); *H04N 5/2257* (2013.01); *H04N 5/23212* (2013.01); *H04N 5/23258* (2013.01); *G03B 2205/0015* (2013.01)

(58) Field of Classification Search
CPC ........... H01L 27/1461; H01L 27/14612; H01L 27/14621; H01L 27/14627; H01L 14/14643; H01L 27/14645
See application file for complete search history.

(56) References Cited

U.S. PATENT DOCUMENTS

| | | | |
|---|---|---|---|
| 2013/0088609 A1 | 4/2013 | Shimizu | |
| 2015/0253583 A1* | 9/2015 | Cho | G02B 13/0015 |
| | | | 348/360 |
| 2016/0301875 A1* | 10/2016 | Iwasaki | G02B 7/09 |
| 2017/0052342 A1* | 2/2017 | Shin | G02B 7/09 |

FOREIGN PATENT DOCUMENTS

| | | |
|---|---|---|
| JP | 2013-083692 A | 5/2013 |
| JP | 2013-160995 A | 8/2013 |
| JP | 2013-167860 A | 8/2013 |

\* cited by examiner

| | |
|---|---|
| 1: IMAGING LENS | 13: OIS MAGNET |
| 2: LENS BARREL | 14: OIS BASE |
| 2a: PROTRUSION | 14a: OPENING |
| 7, 8: PLATE SPRING | 15: GUIDE BALL |
| 9: AF COIL | 16: OIS COIL |
| 10: AF MAGNET | 18: IMAGE SENSOR |
| 11: AF BASE | 20: SENSOR COVER |
| 12: OIS MOVABLE PLATE | 26: MAGNETIC BODY |
| 12a: OPENING | 31: OPTICAL PORTION |
| | 50: CAMERA MODULE |

| 1: IMAGING LENS | 16: OIS COIL |
| 2: LENS BARREL | 18: IMAGE SENSOR |
| 2a: PROTRUSION | 20: SENSOR COVER |
| 7, 8: PLATE SPRING | 23: OIS MOVABLE PLATE AND |
| 9: AF COIL | AF BASE |
| 10: AF MAGNET | 23a: OPENING |
| 13: OIS MAGNET | 23b: RECESS |
| 14: OIS BASE | 26: MAGNETIC BODY |
| 14a: OPENING | 31: OPTICAL PORTION |
| 15: GUIDE BALL | 50: CAMERA MODULE |

| 1: IMAGING LENS | 20: SENSOR COVER |
| --- | --- |
| 2: LENS BARREL | 20a: OPENING |
| 7, 8: PLATE SPRING | 23: OIS MOVABLE PLATE AND |
| 9: AF COIL | AF BASE |
| 10: AF MAGNET | 23a: OPENING |
| 11: AF BASE | 23b: RECESS |
| 13: OIS MAGNET | 24: LENS HOLDER |
| 14: OIS BASE | 24a: PROTRUSION |
| 14a: OPENING | 25: ADHESIVE |
| 15: GUIDE BALL | 26: MAGNETIC BODY |
| 16: OIS COIL | 31: OPTICAL PORTION |
| 18: IMAGE SENSOR | 50: CAMERA MODULE |

1: IMAGING LENS
2: LENS BARREL
2a: PROTRUSION
7, 8: PLATE SPRING
9: AF COIL
10: AF MAGNET
13: OIS MAGNET
15: GUIDE BALL
16: OIS COIL

18: IMAGE SENSOR
19: SUBSTRATE
20: SENSOR COVER
23: OIS MOVABLE PLATE AND AF BASE
23a: OPENING
23b: RECESS
26: MAGNETIC BODY
31: OPTICAL PORTION
50: CAMERA MODULE

3: IMAGING LENS PORTION
4: IMAGE STABILIZATION PORTION
5: IMAGING PORTION
12: OIS MOVABLE PLATE
14: OIS BASE
15: GUIDE BALL
18: IMAGE SENSOR
27a, 27b, 27c, 27d: SMA
31: OPTICAL PORTION
50: CAMERA MODULE

CAMERA MODULE WITH IMAGE STABILIZATION BY MOVING IMAGING LENS

TECHNICAL FIELD

The present invention relates to a camera module to be mounted on electronic equipment such as a mobile phone, and, particularly, to a camera module including an image stabilizer function.

BACKGROUND ART

As to recent mobile phones, a model of a mobile phone having a camera module embedded therein has been dominant. Such a camera module needs to be embedded in the mobile phone, and therefore has a greater demand for miniaturization and weight reduction compared with a digital camera.

Also, there have been an increasing number of examples in which a camera module of a type exhibiting an autofocus (AF) function by a lens driving device is mounted on electronic equipment such as a mobile phone. Examples of the lens driving device include various types such as a type using a stepper motor, a type using a piezoelectric element, and a type using a VCM (Voice Coil Motor), which have already been distributed on the market.

Meanwhile, now that such a camera module having the autofocus function has become a standard, an image stabilizer function is becoming a focus of attention as a next distinctive function. Although the image stabilizer function has been widely adopted for digital cameras and camcorders, there have been only a few models of mobile phones adopting the image stabilizer function, since there is a problem of a size. However, a new structure of an image stabilization mechanism, which allows miniaturization and thinning, has been suggested, and it is expected that a mobile-phone-specified camera module having the image stabilizer function mounted thereon will be more widespread in years to come.

As the image stabilization mechanism, PTL 1 describes an image stabilization device of a lens-shift system or a sensor-shift system. In an imaging unit described in PTL 1, the image stabilization device which drives a lens or an image sensor in directions of two axes perpendicular to an optical axis direction is arranged in a stacked manner on a camera module having an imaging block which drives a lens in the optical axis direction. Note that, the lens in the imaging block is not driven in the directions of the two axes perpendicular to the optical axis direction.

Moreover, PTL 2 describes an example of an image stabilization autofocus camera module of a barrel-shift system, which drives a focus portion including a lens portion and a second driving portion which drives the lens portion in an optical axis direction in the optical axis direction and directions of two axes perpendicular to the optical axis direction. In the camera module described in PTL 2, the focus portion is supported with respect to a base part by four suspension wires. Image stabilization is achieved when the focus portion is driven in the directions of the two axes perpendicular to the optical axis direction.

CITATION LIST

Patent Literature

PTL 1: Japanese Unexamined Patent Application Publication No. 2013-83692 (published on May 9, 2013)

PTL 2: Japanese Unexamined Patent Application Publication No. 2011-128583 (published on Jun. 30, 2011)

SUMMARY OF INVENTION

Technical Problem

It is described that, in a technique disclosed in PTL 1, the image stabilization device including an optical element is driven in the direction of the two axes perpendicular to the optical axis direction for image stabilization.

In a case where the optical element is a lens, the lens is a lens different from an imaging lens which is driven for autofocus (hereinafter, referred to as a stabilization lens). As above, in the image stabilization device of a system driving the stabilization lens, the stabilization lens needs to be separated from the imaging lens, so that there is a problem that a size of an imaging unit increases in the optical axis direction.

On the other hand, in a case where the optical element is an image sensor, the image sensor is to be driven together with a substrate on which the image sensor is mounted. Accordingly, a space is required for preventing the substrate from making a contact with other parts, which also generates the problem that the size of the imaging unit increases in the optical axis direction. In addition, the image sensor requires a large number of wiring lines. Therefore, in the case where the optical element is the image sensor, there is also a problem that electric conduction between a movable part and a fixed part becomes troublesome.

In a technique disclosed in PTL 2, since an entire of a lens driving portion including the lens portion is driven in the directions of the two axes perpendicular to the optical axis direction, it becomes possible to achieve thinning of the camera module.

However, it is necessary to arrange the suspension wires supporting the focus portion in an outside of the focus portion. Thus, a mechanism and a space for arranging the suspension wires in the outside of the focus portion are required, so that there is a problem that a size of the camera module increases in a direction perpendicular to the optical axis direction.

Although PTL 1 and PTL 2 are related to a camera module having an autofocus function, regardless of the camera module having the autofocus function, a similar problem is caused in the case of performing image stabilization.

For example, in the case of a lens portion of a fixed focus system, the lens portion is fixed normally with a method of adhesive fixation after positional adjustment by inserting a lens into a slidable holder or a method of adhesive fixation after positional adjustment by forming a screw in each of a lens barrel and the holder. Accordingly, in the case of the lens portion of the fixed focus system, image stabilization is not performed normally.

However, in the case of the lens portion of the fixed focus system, if image stabilization is tried to be performed by driving a stabilization lens, the stabilization lens is required to be provided separately from an imaging lens.

Further, in the case of the lens portion of the fixed focus system, if image stabilization is tried to be performed by driving an image sensor, a space is required for driving an image stabilization device with respect to a fixed part.

Similarly, in the case of the lens portion of the fixed focus system, if image stabilization is tried to be performed by using suspension wires, a mechanism and a space are required for arranging the suspension wires in an outside of an imaging portion.

Accordingly, also in the case of the lens portion of the fixed focus system, when trying to perform image stabilization by adopting the technique described in PTL 1 or PTL 2, a problem similar to that of PTL 1 or PTL 2 is caused.

Note that, since there are few examples in which a high-end function such as optical image stabilization is mounted on a low-end model employing a lens portion of the fixed focus system or the like, in the case of adopting the fixed focus system, it is hardly necessary to be conscious of the problems of PTL 1 and PTL 2.

Moreover, the camera module described in PTL 2 has a structure in which the entire of the lens driving unit including the focus portion is supported with respect to the base part by the suspension wires, so that it is difficult to separate the focus portion and a driving portion which drives the focus portion in the directions of the two axes perpendicular to the optical axis direction.

That is, in the camera module described in PTL 2, it is difficult to standardize or generalize a device for image stabilization with respect to lens units (lens portions) of various structures (systems) such as a lens unit having the autofocus function, a lens unit of the fixed focus system, a lens unit whose driving mechanism for autofocus has a VCM structure, and a lens unit using a piezoelectric element.

In addition to the above-described problems, in the case of performing image stabilization, there is also a problem that, when a plurality of lenses are relatively displaced in the directions of the two axes perpendicular to the optical axis direction as in the case of using the stabilization lens in addition to the imaging lens, deviation is caused between center positions of the lenses and an optical characteristic is deteriorated. It is therefore desired that an entire of a lens group is moved integrally.

The invention is made in view of the aforementioned problems, and an object thereof is to achieve both of miniaturization and thinning of a camera module having an image stabilization mechanism regardless of a structure of an imaging lens portion, while adopting a structure of driving an entire of a lens group in directions of two axes perpendicular to an optical axis direction.

Solution to Problem

In order to solve the aforementioned problems, a camera module according to one aspect of the invention includes:

an imaging lens portion having imaging lenses and an autofocus driving portion which drives the imaging lenses in an optical axis direction;

an imaging portion having an image sensor; and an image stabilization portion having an opening which faces the image sensor and moving the imaging lens portion in a plane perpendicular to the optical axis direction in a state where the imaging lenses face the image sensor, in which the image stabilization portion includes a movable part on which the imaging lens portion is mounted, a fixed part which is provided closer to the imaging portion than the movable part and does not change a position thereof at a time of image stabilization, and a guide member having a spherical shape, which is provided between the movable part and the fixed part and supports the movable part so as to be movable in a plane perpendicular to the optical axis direction with respect to the fixed part.

Moreover, a camera module according to one aspect of the invention includes:

an imaging lens portion having imaging lenses;

an imaging portion having an image sensor; and an image stabilization portion having an opening which faces the image sensor and moving the imaging lens portion in a plane perpendicular to an optical axis direction in a state where the imaging lenses face the image sensor, in which the imaging lens portion, the image stabilization portion, and the imaging portion are arranged in a stacked manner in the camera module, and the image stabilization portion includes a movable part on which the imaging lens portion is mounted, a fixed part which is mounted on the imaging portion and does not change a position thereof at a time of image stabilization, and a guide member having a spherical shape, which is provided between the movable part and the fixed part and supports the movable part so as to be movable in a plane perpendicular to the optical axis direction with respect to the fixed part.

Advantageous Effects of Invention

In the camera module according to the one aspect of the invention, the imaging lens portion mounted on the movable part is moved in the plane perpendicular to the optical axis direction by the guide member having the spherical shape. That is, in the aforementioned camera module, the imaging lens portion itself moves integrally with the movable part in the plane perpendicular to the optical axis direction. Thus, according to the aforementioned camera module, it is possible to perform image stabilization by driving an entire of a lens group in a direction perpendicular to the optical axis. Further, the aforementioned camera module has a configuration in which the movable part on which the imaging lens portion is mounted is supported by the guide member having the spherical shape. Thus, according to the one aspect of the invention, it is possible to achieve thinning and miniaturization of the camera module regardless of a structure of the imaging lens portion.

DESCRIPTION OF EMBODIMENTS

Embodiment 1

Figure 1:
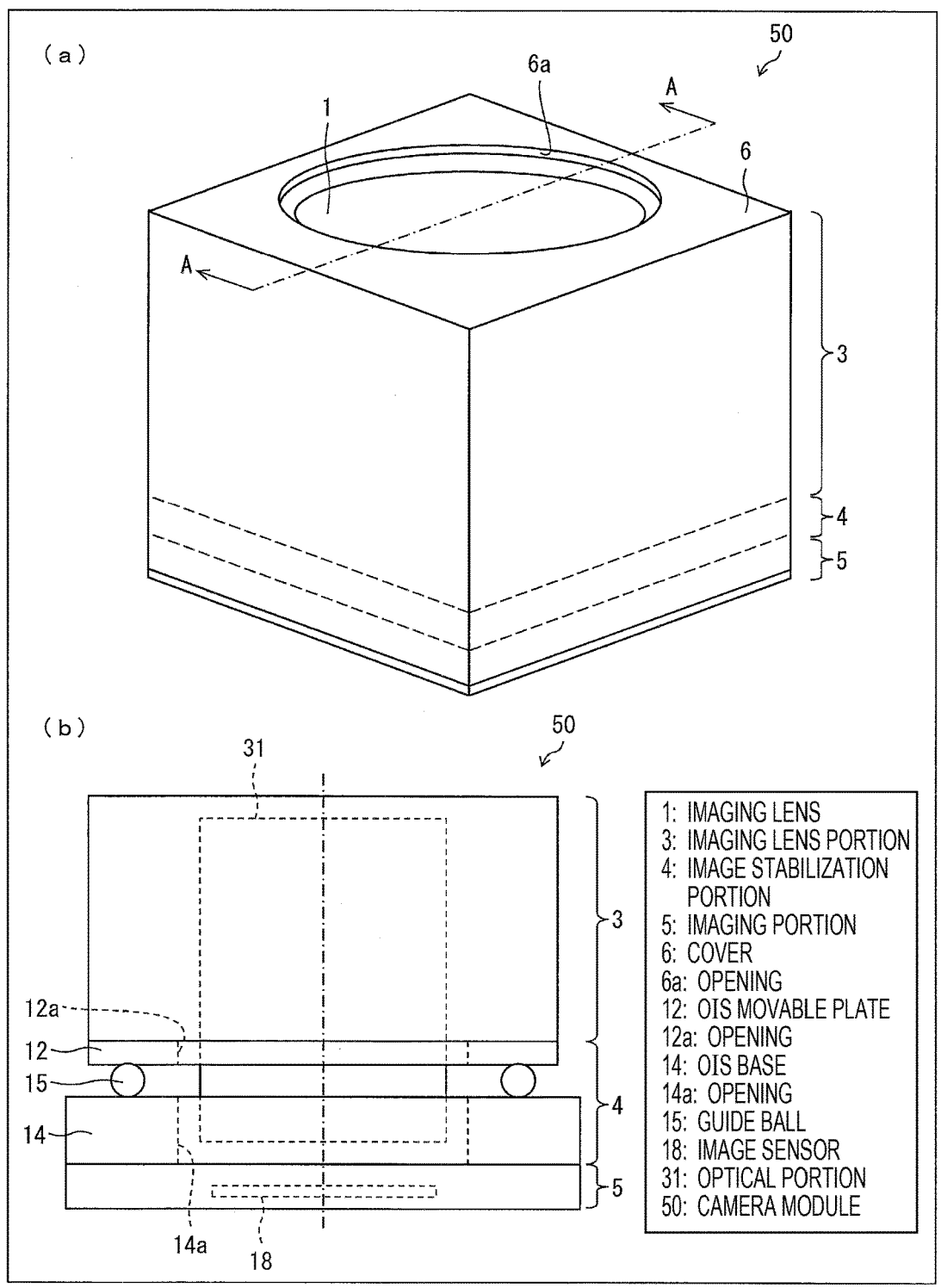
FIG. 1(a) is a perspective view schematically illustrating a schematic configuration of a camera module according to Embodiment 1 of the invention, and (b) is a side view schematically illustrating a schematic configuration of a stacked structure of an imaging lens portion, an image stabilization portion, and an imaging portion which are in a cover of the camera module illustrated in (a).

Hereinafter, one embodiment of the invention will be described in detail with reference to FIGS. 1(a) and (b) to FIG. 4.

Note that, description will be given in the present embodiment by taking, as an example, a camera module having an optical image stabilizer (OIS) function and an autofocus (AF) function.

Moreover, description will be given in the present embodiment by taking, as an example, a case where a VCM (Voice Coil Motor) system is adopted as an autofocus driving mechanism.

(Configuration of Camera Module)

First, an entire structure of a camera module 50 will be described based on FIG. 1(a). FIG. 1(a) is a perspective view schematically illustrating a schematic configuration of the camera module 50 of the present embodiment.

As illustrated in FIG. 1(a), the camera module 50 is provided with an imaging lens portion 3 including imaging lenses 1, an image stabilization portion 4, an imaging portion 5, and a cover 6. The imaging portion 5, the image stabilization portion 4, and the imaging lens portion 3 are arranged in a stacked manner in this order from the imaging portion 5 in an optical axis direction of the imaging lenses 1.

Note that, description will be given below by setting that a side of the imaging lens portion 3 (side of an object) is an upper side and a side of the imaging portion 5 is a lower side, for convenience of the description.

The cover 6 has a box shape which covers the imaging portion 5, the image stabilization portion 4, and the imaging lens portion 3 from above the imaging lens portion 3. An opening 6a is provided at a position in the cover 6, which corresponds to an upper side of the imaging lenses 1. An inner side of the cover 6 may have a black color which does not reflect light.

As described above, the camera module 50 has a configuration in which the imaging lens portion 3, the image stabilization portion 4, and the imaging portion 5 are arranged in the stacked manner. A stacked structure of the camera module 50 will be described here based on FIG. 1(b). FIG. 1(b) is a side view schematically illustrating a schematic configuration of the stacked structure of the imaging lens portion 3, the image stabilization portion 4, and the imaging portion 5, which are in the cover 6, in the camera module 50 illustrated in FIG. 1(a). Note that, FIG. 1(b) illustrates a state where the cover 6 is removed from the camera module 50 illustrated in FIG. 1(a).

As illustrated in FIG. 1(b), the imaging lens portion 3 includes an optical portion 31 described below. In addition, as an AF driving portion (autofocus driving portion) which drives the imaging lenses 1 in the optical axis direction in order for autofocus, an AF coil 9 and an AF magnet 10 (refer to FIG. 2) are arranged in a space surrounding an outer side surface of the optical portion 31.

The image stabilization portion 4 includes an OIS movable plate 12, an OIS base 14, guide balls 15, and the like, which are described below. The optical portion 31 may be arranged so as to protrude as far as a region of the image stabilization portion 4. In this case, an opening 12a described below and an opening 14a described below are provided in the OIS movable plate 12 and the OIS base 14, respectively. A part of the optical portion 31 is arranged inside the opening 12a and the opening 14a.

In addition, as an OIS driving portion (image stabilization driving portion) which drives the imaging lens portion 3 in a plane perpendicular to the optical axis direction in order for image stabilization, OIS magnets 13 and OIS coils 16 (refer to FIG. 2) are arranged in a space surrounding an outer side surface of a part of the optical portion 31, which is arranged so as to protrude as far as the region of the image stabilization portion 4.

In this manner, the camera module 50 has a structure in which each of the imaging lens portion 3, the image stabilization portion 4, and the imaging portion 5 is able to be arranged independently. This makes it possible to make a selection from various systems as an autofocus driving mechanism of the imaging lens portion 3 and an image stabilization driving mechanism of the image stabilization portion 4.

In addition to the VCM system exemplified in the present embodiment, for example, a system that uses a piezoelectric element or a shape memory alloy (SMA), a system in which a shape of a polymer lens is changed, or the like may be selected as the aforementioned autofocus driving mechanism and image stabilization driving mechanism. Further, it is easy to combine driving mechanisms of different manufacturers of the members, and it is possible to consider miniaturization and thinning of each of the imaging lens portion 3, the image stabilization portion 4, and the imaging portion 5 independently.

Figure 2:
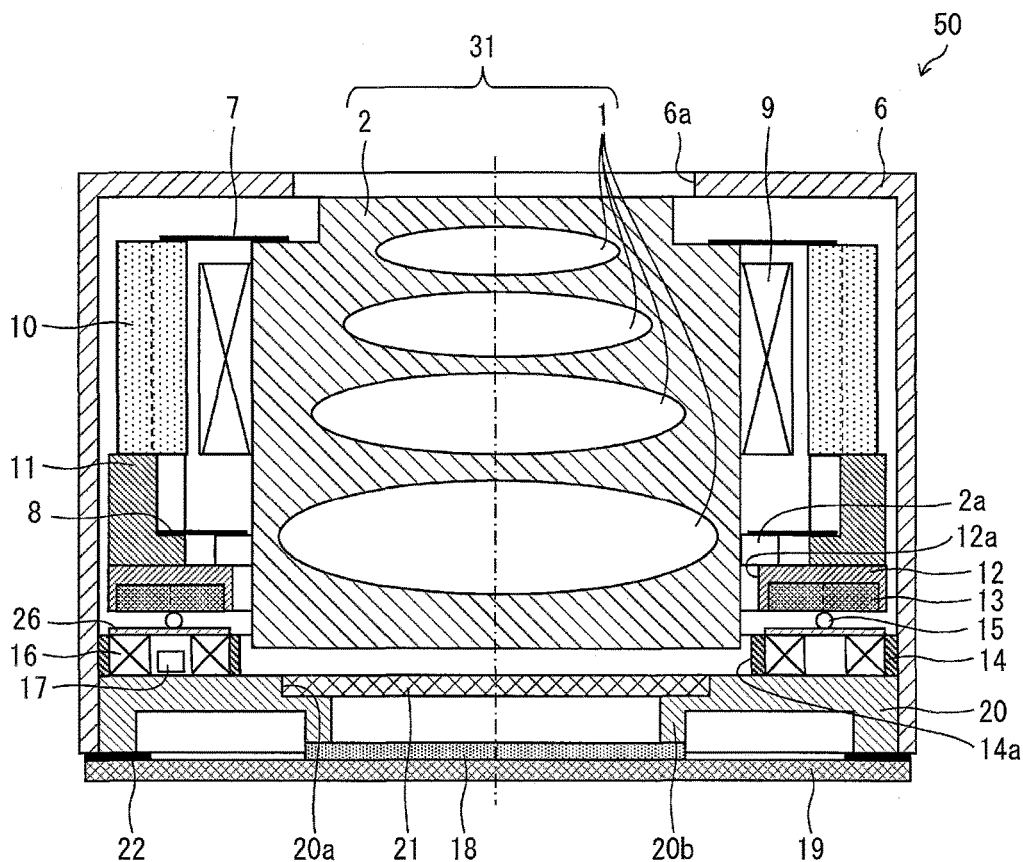
FIG. 2 is a sectional view of the camera module illustrated in FIG. 1(a), which is taken along an A-A line and viewed in an arrow direction.

Next, a structure of each portion of the camera module 50 will be described based on FIG. 2. FIG. 2 is a sectional view of the camera module 50 illustrated in FIG. 1(a), which is taken along A-A and viewed in an arrow direction, and a sectional view obtained by cutting a center part of the camera module 50 along the optical axis direction.

(Configuration of Imaging Lens Portion 3)

The imaging lens portion 3 drives the imaging lenses 1 in the optical axis direction. As illustrated in FIG. 2, the imaging lens portion 3 includes the optical portion 31, plate springs 7 and 8, the AF coil 9, the AF magnet 10, and an AF base 11.

In addition, the optical portion 31 includes a plurality of (four in FIG. 2) imaging lenses 1 and a lens barrel 2.

The imaging lenses 1 guide light from an outside to an image sensor 18 of the imaging portion 5. An axial center of the image sensor 18 coincides with the optical axis of the imaging lenses 1.

The lens barrel 2 holds, in an inside thereof, the plurality of (four in FIG. 2) imaging lenses 1. An axial center of the lens barrel 2 also coincides with the optical axis of the imaging lenses 1.

A protrusion 2a provided so as to protrude in a direction perpendicular to the optical axis is provided in an outer periphery of the lens barrel 2. The protrusion 2a serves as a stopper at a mechanical end on an infinite distance side and an attachment part of the plate spring 8.

Note that, one whose outer shape is a cuboid shape is used as the lens barrel 2 in the present embodiment, but there is no limitation thereto, and one whose outer shape is a round column shape may be used, for example.

The AF base 11 is a hollow rectangular member, and the AF magnet 10 is fixed on a top surface thereof.

The plate springs 7 and 8 are metal springs an inner side and an outer side of each of which are connected by arm parts of the plate spring having a spiral shape, and which are widely used in existing camera modules having the AF function. The plate springs 7 and 8 are arranged in pair respectively in an upper part and a lower part of the lens barrel 2 with a predetermined gap therebetween so as to surround the lens barrel 2.

Among the pair of the plate springs 7 and 8, an inner end part of the plate spring 7 arranged in the upper side is fixed to an upper part of the lens barrel 2, and an outer end part of the plate spring 7 arranged in the upper side is fixed to the AF base 11 via the AF magnet 10. An inner end part of the plate spring 8 arranged in the lower side is fixed to a lower part of the lens barrel 2, and an outer end part of the plate spring 8 arranged in the lower side is fixed to the AF base 11.

The plate springs apply a downward force to the lens barrel 2, and causes a part (lower end) of the lens barrel 2 to enter the opening 14a, which is provided in a center part of the OIS base 14, in a state where an electric current does not flow through the AF coil 9.

As described above, the AF coil 9 and the AF magnet 10 function as the AF driving portion.

Figure 3:
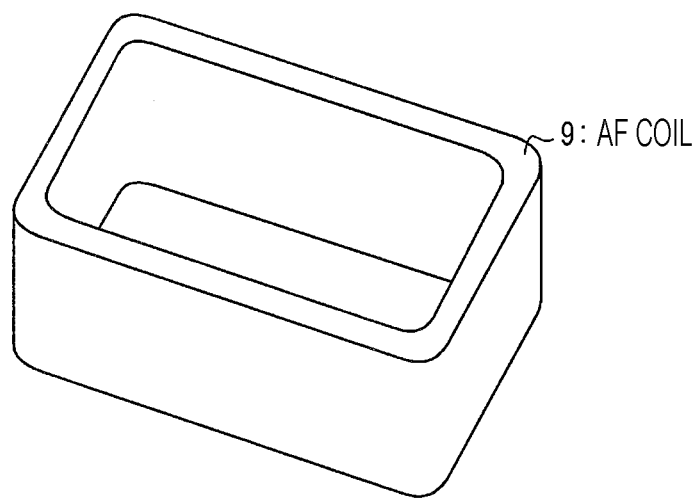
FIG. 3 is a view schematically illustrating a schematic configuration of an AF coil according to Embodiment 1 of the invention.

The AF coil 9 is arranged and fixed to an outer side surface of the lens barrel 2. The AF coil 9 is wound in a quadrilateral shape as FIG. 3 so as to surround the lens barrel 2. An axis of the AF coil 9 coincides with the optical axis.

The AF magnet 10 is arranged so as to be opposed to each side surface of the AF coil 9 which is wound in the quadrilateral shape. The AF magnet 10 is arranged so that respective magnetic poles having the same magnetism face inside (so that the magnetic poles having the same magnetism are opposed to the AF coil 9).

The AF base 11 and the AF magnet 10 function as an AF fixed part whose position does not change at a time of autofocus. On the other hand, the optical portion 31 and the AF coil 9 function as an AF movable part which is movable (that is, whose position changes) in the optical axis direction at the time of autofocus.

(Configuration of Image Stabilization Portion 4)

The image stabilization portion 4 drives the imaging lens portion 3 in the plane perpendicular to the optical axis for image stabilization.

The image stabilization portion 4 includes the OIS movable plate (movable part) 12, OIS magnets (permanent magnet, movable part) 13, the OIS base (fixed part) 14, the guide balls (guide member) 15, OIS coils (coil) 16, hall elements 17, and a magnetic body (magnetic body, movable part) 26.

The OIS movable plate 12 is a member in a flat plate shape, which has the opening 12a into which a part of the lens barrel 2 is able to be inserted in the optical axis direction, and the AF base 11 is fixed to a top surface of the OIS movable plate 12.

The protrusion 2a of the lens barrel 2 abuts on the OIS movable plate 12 in a state where an electric current does not flow through the AF coil 9 and gravity acts downwardly. In the present embodiment, when the optical portion 31 is positioned so that a bottom surface of the protrusion 2a (surface opposed to the OIS movable plate 12) abuts on the OIS movable plate 12 in a state where the optical portion 31 is positioned at an infinite distance end (mechanical end on the infinite distance side), positioning (determination of initial positions) of the imaging lenses 1 is performed.

The protrusion 2a is provided at a position with which a part of the lens barrel 2 is arranged inside the opening 12a of the OIS movable plate 12 and the opening 14a of the OIS base 14 in a state where the protrusion 2a abuts on the OIS movable plate 12.

Accordingly, in the present embodiment, the part of the lens barrel 2 enters the opening 12a of the OIS movable plate 12 and the opening 14a of the OIS base 14 in a state where the lens barrel 2 is embedded in the camera module 50, as illustrated in FIG. 2.

The OIS base 14 is a rectangular member having the opening 14a which is capable of inserting the part of the lens barrel 2 therethrough in the optical axis direction, and the OIS coils 16 and the hall elements 17 are fixed in an inner part of the OIS base 14. The OIS base 14 changes a position thereof neither at the time of autofocus nor at a time of image stabilization.

The guide balls 15 are in sliding contact with the OIS movable plate 12, and support the OIS movable plate 12 so as to be movable in a plane perpendicular to the optical axis direction with respect to the OIS base 14.

A material of the guide balls 15 is ceramics, for example. Note that, although the material of the guide balls 15 is not limited to the ceramics, it is desired to be a nonmagnetic material which is less likely to be affected by a magnetic field resulting from the OIS magnets 13 and the OIS coils 16.

The hall elements 17 detect displacement of the OIS movable plate 12 in the plane perpendicular to the optical axis direction. A plurality of hall elements 17 are respectively arranged inside openings of the OIS coils 16 in a state of being opposed to the OIS magnets 13 (two pieces are normally arranged in order to detect displacement in directions of two axes which are perpendicular to the optical axis direction).

The magnetic body 26 is a hollow flat-plate member arranged on a top surface of the OIS base 14, and abuts on the guide balls 15. A material thereof only needs to be one with which magnetic attraction is generated between the magnetic body 26 and the OIS magnets 13, such as iron.

By providing the magnetic body 26, with which the magnetic attraction between the magnetic body 26 and the OIS magnets 13 acts, at a position abutting on the guide balls 15 in this manner, it is possible to prevent the guide balls 15 from floating from a surface of the OIS movable plate 12. Thus, with the aforementioned configuration, it is possible to smoothly move the imaging lens portion 3 and an OIS movable part in the plane perpendicular to the optical axis direction. Further, since the OIS coils 16 and the guide balls 15 are not directly in contact with each other, it is possible to prevent the OIS coils 16 from being damaged.

The OIS coils 16 and the OIS magnets 13 function as the OIS driving portion, as described above.

Figure 4:
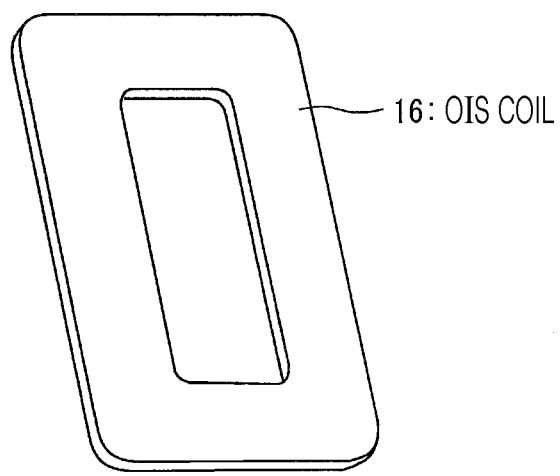
FIG. 4 is a view schematically illustrating a schematic configuration of an OIS coil according to Embodiment 1 of the invention

Each of the OIS coils 16 is toroidally wound in a substantially oval shape (which is longitudinal in a direction orthogonal to one axis of the two axes orthogonal to the optical axis), as illustrated in FIG. 4, and a plurality of OIS coils 16 (in the present embodiment, one piece for each side, that is, four pieces in total) are arranged inside the OIS base 14.

A plurality of OIS magnets 13 (normally the same number of pieces as that of the OIS coils 16) are arranged in a lower side of the OIS movable plate 12 in a state where different magnetic poles are opposed to long-side sides of the OIS coils 16.

The OIS movable plate 12 and the OIS magnets 13 function as an OIS movable part which is movable in a direction perpendicular to the optical axis by rolling of the guide balls 15. On the other hand, the OIS base 14 and the magnetic body 26 support the guide balls 15, and positions thereof are not changed by the rolling of the guide balls 15, and the positions thereof changes neither at the time of autofocus nor at the time of image stabilization. Accordingly, the OIS base 14 and the magnetic body 26 function as an OIS fixed part.

(Configuration of Imaging Portion 5)

The imaging portion 5 performs imaging of light which passes through the imaging lenses 1. The imaging portion 5 includes the image sensor 18, a substrate 19, a sensor cover 20, and a glass substrate 21.

The image sensor 18 receives the light which arrives thereat after passing through the imaging lenses 1 and performs photoelectric conversion, and obtains an object image formed on the image sensor 18.

The sensor cover 20, on which the imaging lens portion 3 and the image stabilization portion 4 are mounted and a tip surface of a protrusion 20b provided in a lower part of which abuts on the image sensor 18, is placed on the image sensor 18 so as to cover the whole image sensor 18. When the tip surface of the protrusion 20b abuts on the image sensor 18 in this manner, position accuracy of the imaging lenses 1 in the optical axis direction with respect to the image sensor 18 is improved. In addition, the sensor cover 20 is provided with an opening 20a, which passes therethrough in an up-and-down direction, in the center thereof, and the opening 20a is closed by the glass substrate 21 having an IR (Infrared) cutting function.

The image sensor 18 is mounted on the substrate 19. There is a case where a gap is generated between the substrate 19 and the sensor cover 20 due to a tolerance, and the substrate 19 and the sensor cover 20 are adhesively fixed to each other in a state where the gap is closed by an adhesive 22.

(AF Driving Mechanism and OIS Driving Mechanism)

The AF function of moving the AF movable part in the optical axis direction is realized by the AF driving portion (AF driving mechanism) including the AF coil 9 and the AF magnet 10.

That is, when an electric current flows through the AF coil 9, an electromagnetic force generated between the AF coil 9 and the AF magnet 10 acts on the lens barrel 2, and the AF movable part moves in the optical axis direction.

On the other hand, an OIS function of moving the imaging lens portion and the OIS movable plate 12 in the plane perpendicular to the optical axis direction is realized by the OIS driving portion (OIS driving mechanism) including the OIS coils 16 and the OIS magnets 13.

That is, when an electric current flows through the OIS coils 16, an electromagnetic force generated between the OIS coils 16 and the OIS magnets 13 acts on the OIS movable plate 12. By rolling of the guide balls 15, the OIS movable plate 12 moves in the plane perpendicular to the optical axis direction with respect to the OIS base 14. The imaging lens portion 3 mounted on the OIS movable plate 12 thereby moves in the plane perpendicular to the optical axis direction. With such a configuration, the imaging lenses 1 themselves move in the plane perpendicular to the optical axis direction integrally with the OIS movable plate 12, so that it is possible to move an entire of a lens group in the plane perpendicular to the optical axis direction.

Note that, in the present embodiment, the hall elements 17 which detect a position of the OIS movable plate 12 with respect to the image sensor 18 are mounted inside the camera module 50. Since it is possible to appropriately control, by the hall elements 17, an amount and a direction of displacement of the OIS movable plate 12 in accordance with an amount and a direction of hand shake, stabilization accuracy of image stabilization is able to be enhanced.

Effect

According to the present embodiment, since the entire of the lens group moves in the plane perpendicular to the optical axis direction, it is not necessary to arrange, separately from imaging lenses, an image stabilization device for moving a stabilization lens or an image sensor in the direction perpendicular to the optical axis direction, which is necessary in PTL 1. It is therefore possible to perform thinning of the camera module 50.

Additionally, according to the present embodiment, since the entire of the lens group is moved in the plane perpendicular to the optical axis direction, a problem that center positions of lenses are deviated from each other and an optical characteristic is deteriorated is not caused. Thus, according to the present embodiment, it is possible to provide the camera module 50 which has an excellent optical characteristic.

Moreover, according to the present embodiment, the OIS movable plate 12 on which the imaging lens portion 3 is mounted is supported by the guide balls 15. Therefore, it is not necessary to install a member for fixing a lens portion and a movable part of an image stabilization mechanism, such as suspension wires in PTL 2, in an outside of the imaging lenses or the like. Accordingly, it is not necessary to provide a mechanism or a space for installing the suspension wires, thus making it possible to miniaturize the camera module 50.

Further, according to the present embodiment, the imaging lens portion 3 and the OIS movable plate 12 are only supported by the guide balls 15, and the imaging lens portion 3 and a driving mechanism for making the OIS movable plate 12 movable are not connected directly. Accordingly, since each of the imaging lens portion 3 and the OIS movable plate 12 has a mutually independent configuration, it is easy to perform separation, thus making it possible to use any lens unit for the imaging lens portion. Therefore, according to the present embodiment, it is possible to achieve both of miniaturization and thinning of the camera module 50 regardless of a structure of the imaging lens portion 3.

Furthermore, in the present embodiment, a part of the lens barrel 2 is arranged inside the opening 12a of the OIS movable plate 12 and the opening 14a of the OIS base 14. With the aforementioned configuration, it is possible to suppress a thickness of the camera module 50 by a thickness of the inserted part of the lens barrel 2, thus making it possible to perform further thinning of the camera module 50. Moreover, it is also possible to effectively use a space corresponding to the inserted part of the lens barrel 2.

Modified Example

As to the AF driving mechanism and the OIS driving mechanism, it is possible to mount either the coils or the magnets on either a movable part side or a fixed part side in any combination, and it is possible to use a configuration in which the coils and the magnets in the exemplified configuration are switched. However, since a mass of the magnets is great compared with that of the coils, it is efficient to mount the coils on the movable part side and mount the magnets on the fixed part side in terms of energy.

In the present embodiment, description has been given by taking, as an example, a case where the magnetic body 26 with which the magnetic attraction between the magnetic body 26 and the OIS magnets 13 acts is provided at a position abutting on the guide balls 15. However, in the present embodiment, there is no limitation to the aforementioned configuration as long as an urging force for preventing the guide balls 15 from floating from the surface of the OIS movable plate 12 is able to be applied to the guide balls 15. For example, instead of the magnetic body 26, a spring which applies the urging force to the guide balls 15 may be provided.

Though description has been given in the present embodiment by setting that the side of the imaging lenses 1 is the upper side and the side of the imaging portion 5 is the lower side, an up-and-down direction at a time of use is not prescribed thereby, and the upper side and the lower side may be inverted, for example.

Embodiment 2

Another embodiment of the invention will be described as follows based on FIG. 5. Note that, for convenience of description, the same reference signs are assigned to members having the same functions as those of the members described in Embodiment 1 above, and description thereof will be omitted.

(Configuration of Camera Module)

Figure 5:
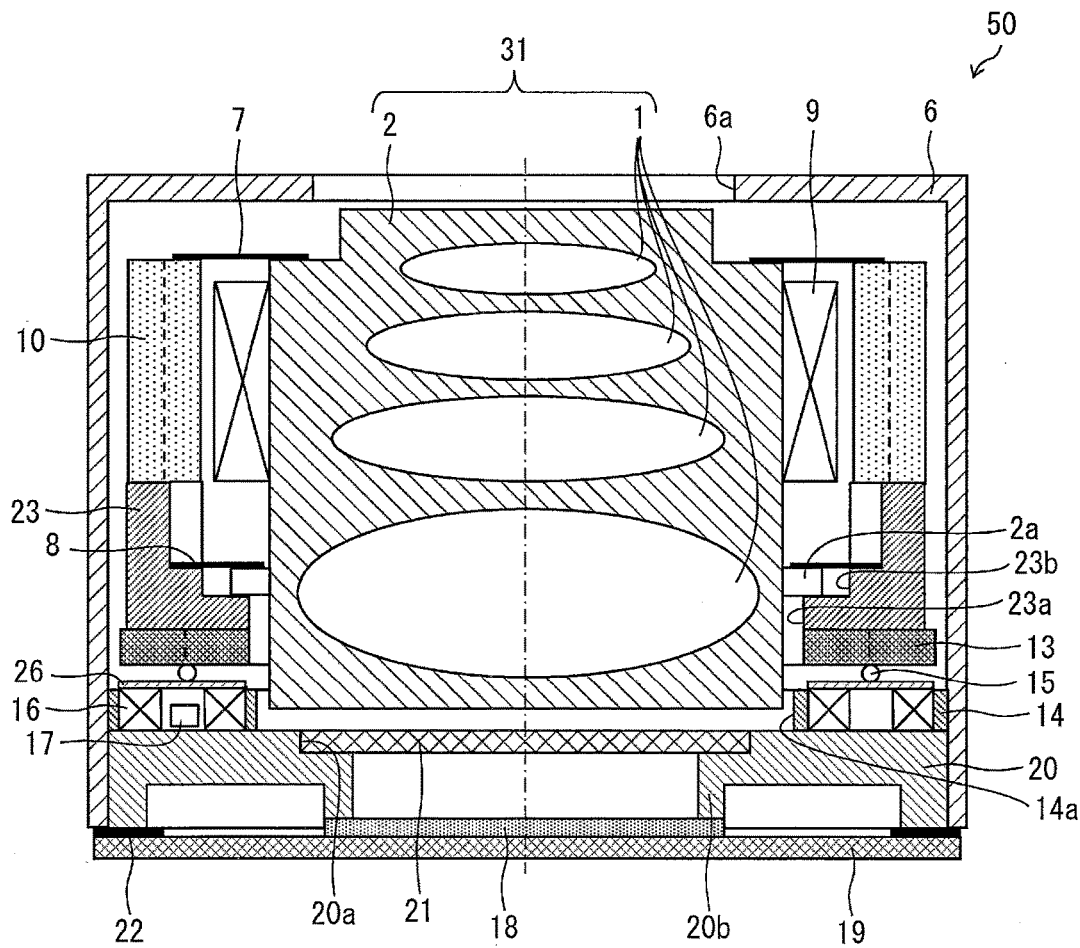
FIG. 5 is a sectional view schematically illustrating a schematic configuration of a camera module according to Embodiment 2 of the invention.

FIG. 5 is a sectional view schematically illustrating a schematic configuration of the camera module 50 according to the present embodiment. Note that, FIG. 5 corresponds to the sectional view which is taken along the A-A line and viewed in the arrow direction in the camera module 50 illustrated in FIG. 1.

As illustrated in FIG. 5, the camera module 50 according to the present embodiment is different from the camera module 50 according to Embodiment 1 in that the OIS movable plate 12 and the AF base 11 are made common.

The camera module 50 according to the present embodiment includes an OIS movable plate and AF base (movable part) 23 instead of the OIS movable plate 12 and the AF base 11 in the camera module 50 according to Embodiment 1. The OIS movable plate and AF base 23 functions as an OIS movable part and AF fixed part.

In a bottom wall of the OIS movable plate and AF base 23, a recess 23b having an opening 23a which passes through a center part of the bottom wall in an up-and-down direction is provided.

In the present embodiment, when the protrusion 2a abuts on the recess 23b, an initial position of the lens barrel 2 is determined with respect to the OIS movable plate and AF base 23.

The protrusion 2a abuts on the recess 23b in a state where an electric current does not flow through the AF coil 9 and gravity acts downwardly. In the present embodiment, when the optical portion 31 is positioned so that the bottom surface of the protrusion 2a (surface opposed to the recess 23b) abuts on the recess 23b in a state where the optical portion 31 is positioned at the infinite distance end (mechanical end on the infinite distance side), positioning of the imaging lenses 1 is performed.

The protrusion 2a is provided at a position with which a part of the lens barrel 2 is arranged inside the opening 23a of the OIS movable plate and AF base 23 and the opening 14a of the OIS base 14 in a state where the protrusion 2a abuts on the recess 23b.

The AF magnet 10 is fixed onto the OIS movable plate and AF base 23 so as to be opposed to each side surface of the AF coil 9.

In addition, similarly to Embodiment 1, the OIS magnets 13 are arranged on a lower side of the OIS movable plate and AF base 23.

Effect

As above, according to the present embodiment, by mounting the lens barrel 2 on the OIS movable plate and AF base 23, the imaging lens portion 3 is mounted on the OIS movable part similarly to Embodiment 1. Thereby, by rolling of the guide balls 15, the imaging lens portion 3 mounted on the OIS movable plate and AF base 23 moves integrally with the OIS movable plate and AF base 23 in the plane perpendicular to the optical axis direction also in the present embodiment.

Moreover, as described above, a part of the lens barrel 2 is arranged inside the opening 23a of the OIS movable plate and AF base 23 and the opening 14a of the OIS base 14 also in the present embodiment. Accordingly, an effect similar to that of Embodiment 1 is able to be obtained also in the present embodiment.

Further, according to the present embodiment, it is possible to reduce the number of parts by making the OIS movable plate 12 and the AF base 11 common. In addition, since space saving is realized, it is possible to perform further thinning of the camera module 50.

Embodiment 3

Another embodiment of the invention will be described as follows based on FIG. 6. Note that, for convenience of description, the same reference signs are assigned to members having the same functions as those of the members described in Embodiments 1 and 2 above, and description thereof will be omitted.

(Configuration of Camera Module)

Figure 6:
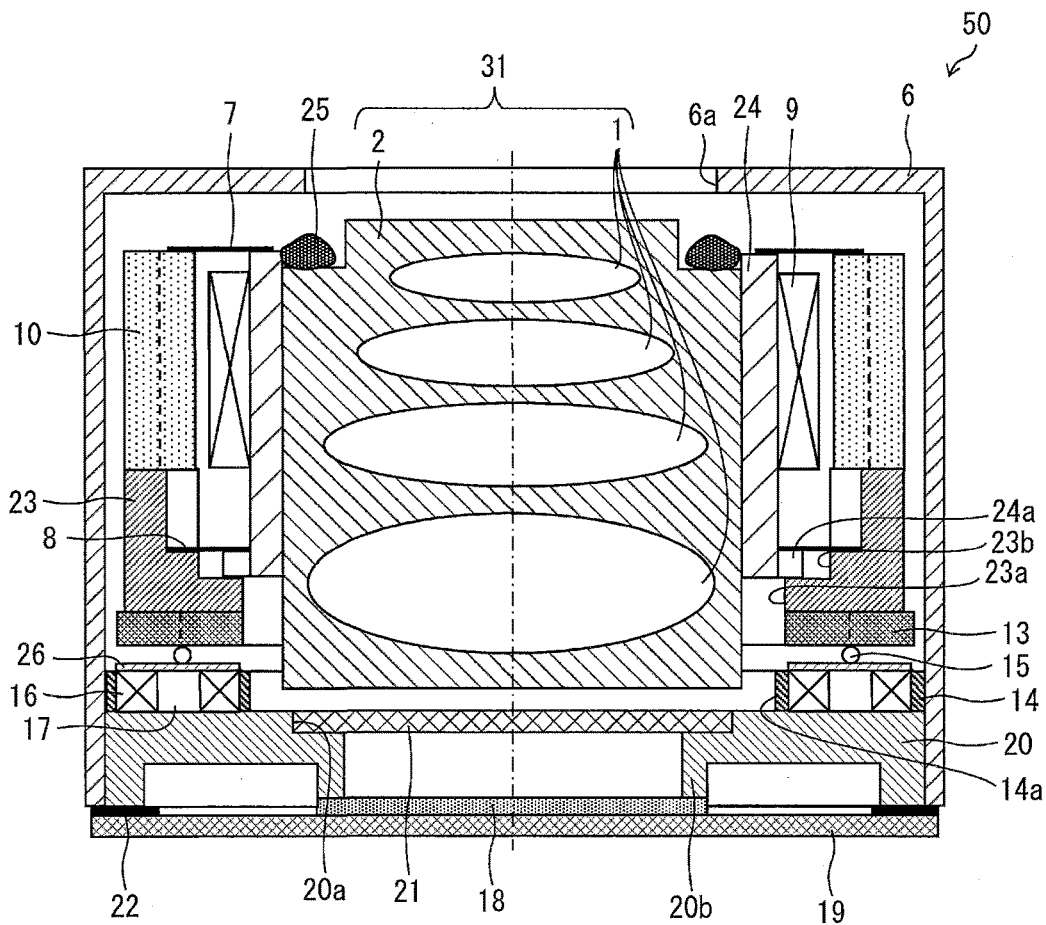
FIG. 6 is a sectional view schematically illustrating a schematic configuration of a camera module according to Embodiment 3 of the invention.

FIG. 6 is a sectional view schematically illustrating a schematic configuration of the camera module 50 according to the present embodiment. Note that, FIG. 6 corresponds to the sectional view which is taken along the A-A line and viewed in the arrow direction in the camera module 50 illustrated in FIG. 1.

As illustrated in FIG. 6, in addition to the imaging lenses 1 and the lens barrel 2, the optical portion 31 according to the present embodiment includes a lens holder 24 which holds the lens barrel 2 in an inside thereof.

The camera module 50 according to the present embodiment is different from the camera module 50 according to Embodiment 2 not only in that the lens holder 24 is included but also in that, instead of the protrusion 2a, a protrusion 24a provided so as to protrude in the direction perpendicular to the optical axis is provided in an outer periphery of the lens holder 24.

The protrusion 24a abuts on the recess 23b in a state where an electric current does not flow through the AF coil 9 and gravity acts downwardly. In the present embodiment, an initial position of the lens holder 24 is thereby determined with respect to the OIS movable plate and AF base 23.

After positional adjustment in the optical axis direction, the lens barrel 2 is fixed, with an adhesive 25, to the lens holder 24 mounted on the OIS movable plate and AF base 23. The two plate springs 7 and 8 in the upper and lower parts support the lens holder 24 so as to be movable in the optical axis direction.

The lens barrel 2 is fixed to the lens holder 24 at a position with which a part of the lens barrel 2 is arranged inside the opening 23a of the OIS movable plate and AF base 23 and the opening 14a of the OIS base 14 in a state where the optical portion 31 is positioned at the infinite distance end.

Effect

As above, according to the present embodiment, by mounting the lens holder 24 on the OIS movable plate and AF base 23, the imaging lens portion 3 is mounted on the OIS movable part similarly to Embodiment 2. Moreover, a part of the lens barrel 2 is arranged inside the opening 23a of the OIS movable plate and AF base 23 and the opening 14a of the OIS base 14 also in the present embodiment. It is therefore possible to obtain an effect similar to that of Embodiment 2 also in the present embodiment.

Further, according to the present embodiment, since the lens barrel 2 and the lens holder 24 are provided individually, differently from a case where the protrusion 2a is provided, it is possible to perform positional adjustment of the lens barrel 2 in the optical axis direction freely to a certain degree within a range of a length of the lens holder 24 in the optical axis direction.

Thus, according to the present embodiment, it is possible to easily and precisely set the initial positions of the imaging lenses 1 in the optical axis direction with respect to the image sensor 18.

Modified Example

Note that, description has been given in the present embodiment by taking, as an example, a case where the lens holder 24 is provided in the camera module 50 according to Embodiment 2. However, the present embodiment is not limited thereto, and it is needless to say that the lens holder 24 may be provided in the camera module 50 according to Embodiment 1. It is possible to obtain an effect similar to the above also in this case.

Embodiment 4

Another embodiment of the invention will be described as follows based on FIG. 7. Note that, for convenience of description, the same reference signs are assigned to members having the same functions as those of the members described in Embodiments 1 to 3 above, and description thereof will be omitted.

(Configuration of Camera Module)

Figure 7:
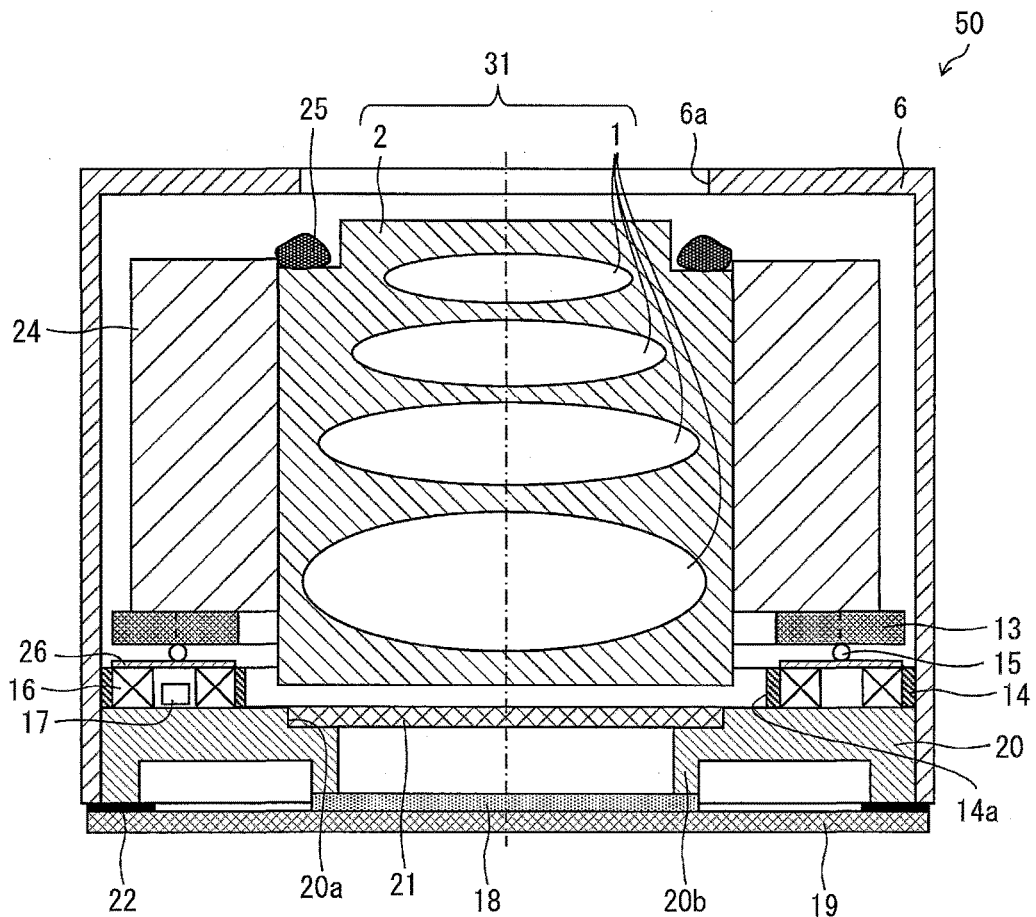
FIG. 7 is a sectional view schematically illustrating a schematic configuration of a camera module according to Embodiment 4 of the invention.

FIG. 7 is a sectional view schematically illustrating a schematic configuration of the camera module 50 according to the present embodiment. Note that, FIG. 7 corresponds to the sectional view which is taken along the A-A line and viewed in the arrow direction in the camera module 50 illustrated in FIG. 1.

As illustrated in FIG. 7, the camera module 50 according to the present embodiment is different from the camera module 50 according to Embodiment 3 in that none of the plate springs 7 and 8, the AF coil 9, the AF magnet 10, the OIS movable plate and AF base 23, and the protrusion 24a is included, and the imaging lenses 1 are fixed focus lenses.

Similarly to Embodiments 1, 2, and 3, the OIS base 14 is mounted on a surface of the sensor cover 20 constituting a part of the imaging portion 5, which is on an image stabilization portion 4 side (more specifically, a side provided with the opening 20a) also in the present embodiment. Thus, a position of the OIS base 14 is not changed with respect to the imaging portion 5 in any case including the time of image stabilization.

Moreover, similarly to Embodiment 3, the lens barrel 2 and the lens holder 24 are separately provided, and the lens barrel 2 is fixed to the lens holder 24 with the adhesive 25 after positional adjustment in the optical axis direction.

However, the imaging lenses 1 are the fixed focus lenses, so that none of the plate springs 7 and 8, the AF coil 9, and the AF magnet 10 exists, and the lens holder 24 functions also as the AF base 11 and the OIS movable plate 12.

Thus, the lens holder 24 is mounted directly on the OIS magnets 13 in the present embodiment.

In the present embodiment, the lens barrel 2 is fixed to the lens holder 24 at a position with which a part of the lens barrel 2 is arranged inside the opening 14a of the OIS base 14 in a state where the optical portion 31 is positioned at the infinite distance end.

Effect

As above, according to the present embodiment, the lens holder 24 is mounted on the OIS magnets 13, and thereby the imaging lens portion 3 is mounted on the OIS movable part similarly to Embodiment 3. Moreover, the part of the lens barrel 2 is arranged inside the opening 14a of the OIS base 14 also in the present embodiment. Further, similarly to Embodiment 3, since the lens barrel 2 and the lens holder 24 are provided individually, it is possible to perform positional adjustment of the lens barrel 2 in the optical axis direction freely to a certain degree within the range of the length of the lens holder 24 in the optical axis direction also in the present embodiment. Therefore, it is possible to obtain an effect similar to that of Embodiment 3 also in the present embodiment.

In addition, according to the present embodiment, since the imaging lenses 1 are the fixed focus lenses, it is possible to realize an image stabilizer function, which is conventionally assumed to be included in an autofocus camera module, also in a camera module of a fixed focus system.

Further, according to the present embodiment, the AF driving portion becomes unnecessary, so that it is possible to simplify a configuration of the imaging lens portion in the direction perpendicular to the optical axis, and to attain further miniaturization of the camera module 50.

Modified Example

Note that, description has been given in the present embodiment by taking, as an example, a case where the lens holder 24 is mounted on the OIS magnets 13. However, the present embodiment is not limited thereto, and the lens holder 24 may be mounted on the OIS movable plate 12 or the OIS movable plate and AF base 23. Moreover, the protrusion 2a may be provided in the lens barrel 2 instead of the lens holder 24, and the protrusion 2a may be mounted on the OIS movable plate 12 or the OIS movable plate and AF base 23. In this manner, the OIS movable part of the camera module 50 may have the same configuration as that of Embodiment 1, for example.

Embodiment 5

Another embodiment of the invention will be described as follows based on FIG. 8. Note that, for convenience of description, the same reference signs are assigned to members having the same functions as those of the members described in Embodiments 1 to 4 above, and description thereof will be omitted.

(Configuration of Camera Module)

Figure 8:
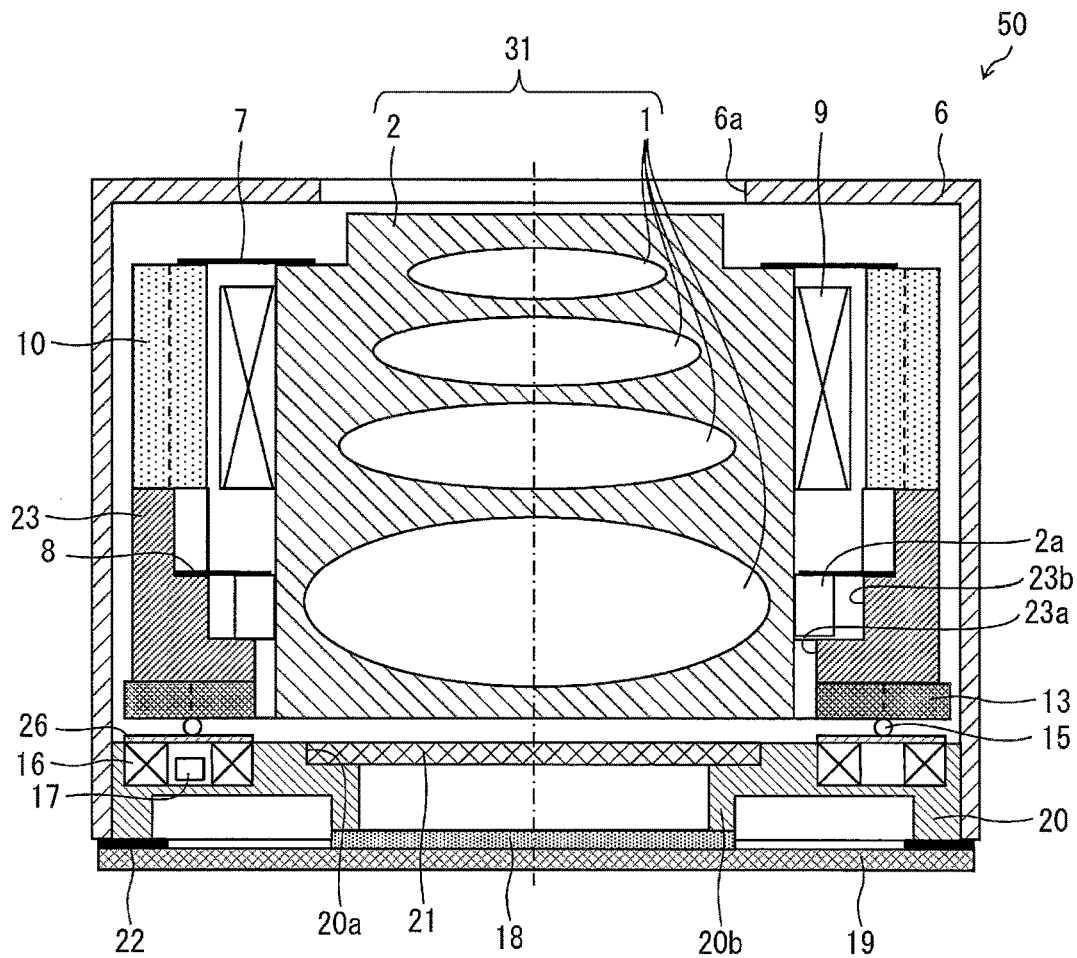
FIG. 8 is a sectional view schematically illustrating a schematic configuration of a camera module according to Embodiment 5 of the invention.

FIG. 8 is a sectional view schematically illustrating a schematic configuration of the camera module 50 according to the present embodiment. Note that, FIG. 8 corresponds to the sectional view which is taken along the A-A line and viewed in the arrow direction in the camera module 50 illustrated in FIG. 1.

The camera module 50 according to the present embodiment is different from the camera module 50 according to Embodiment 2 in that the OIS base 14 and the sensor cover 20 are made common.

The camera module 50 according to the present embodiment is obtained by, in the camera module 50 according to Embodiment 2, removing the OIS base 14 and embedding the OIS coils 16 and the hall elements 17 for detection of displacement at positions inside the sensor cover 20, which are opposed to the OIS magnets 13. Thereby, in the present embodiment, the sensor cover 20 is used as an OIS base and sensor cover (OIS fixed part and imaging portion).

Note that, in the present embodiment, by removing the OIS base 14 and embedding the OIS coils 16 and the hall elements 17 into the sensor cover 20, the lens barrel 2 is fixed to the lens holder 24 at a position with which a part of the lens barrel 2 is arranged inside the opening 23a of the OIS movable plate and AF base 23 in a state where the optical portion 31 is positioned at the infinite distance end.

Effect

As above, according to the present embodiment, similarly to Embodiment 2, the lens barrel 2 is mounted on the OIS movable plate and AF base 23, and thereby the imaging lens portion 3 is mounted on the OIS movable part. Moreover, the present embodiment is similar to Embodiment 2 also in that the part of the lens barrel 2 is arranged inside the opening 23a of the OIS movable plate and AF base 23. Thus, it is possible to obtain an effect similar to that of Embodiment 2 also in the present embodiment.

Furthermore, according to the present embodiment, by making the OIS base 14 and the sensor cover 20 common, it is possible to reduce the number of parts. Space saving is thereby realized, so that it is possible to perform further thinning of the camera module 50.

Embodiment 6

Another embodiment of the invention will be described as follows based on FIG. 9. Note that, for convenience of description, the same reference signs are assigned to members having the same functions as those of the members described in Embodiments 1 to 5 above, and description thereof will be omitted.

(Configuration of Camera Module)

Figure 9:
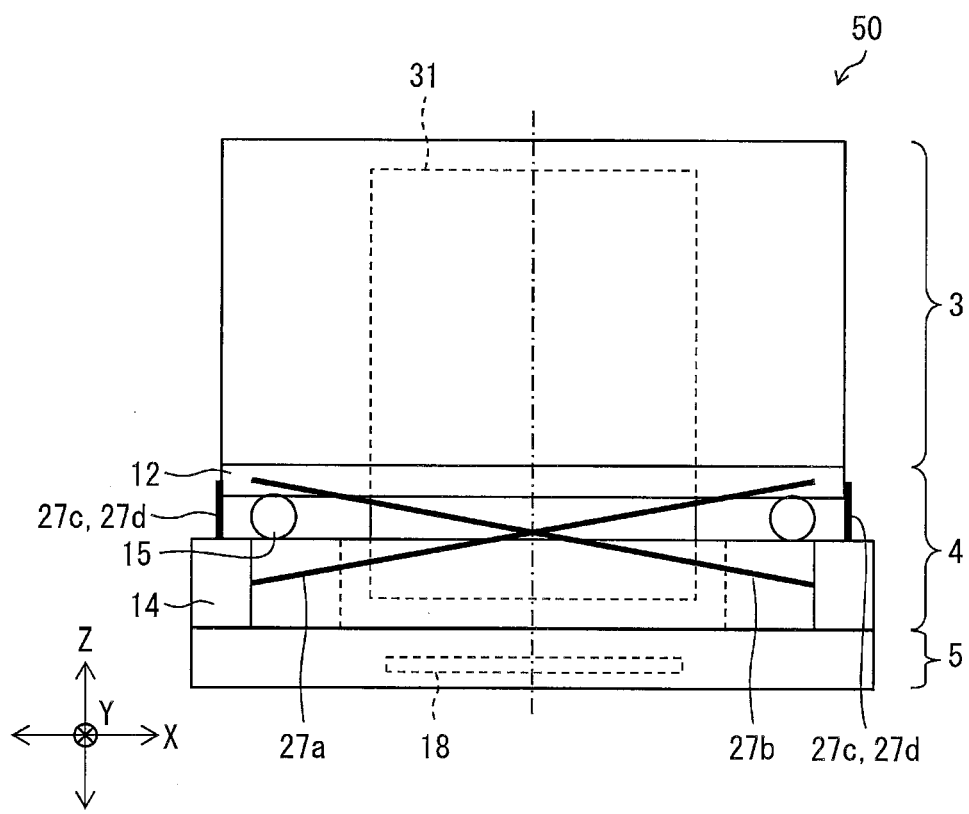
FIG. 9 is a side view schematically illustrating a schematic configuration of a main part of a camera module according to Embodiment 6 of the invention.

FIG. 9 is a side view schematically illustrating a schematic configuration of a main part of the camera module 50 according to the present embodiment. Note that, FIG. 9 corresponds to a view in which the cover 6 is removed from the camera module 50 illustrated in FIG. 1(a).

The camera module 50 of the present embodiment is different from the camera module 50 according to Embodiments 1 to 5 in that shape memory alloys (SMAs, hereinafter, described as "SMAs") 27a to 27d are used as the OIS driving portion (OIS driving mechanism).

As illustrated in FIG. 9, the SMAs 27a to 27d are SMA wires (SMA elements) each of which is formed in a wire shape, and have characteristics of generating heat by themselves when an electric current flows through the elements, and shrinking by the heat.

One end part of each of the SMAs 27a and 27b is installed in the OIS movable plate 12 and the other end part is installed in the OIS base 14 so that the SMAs 27a and 27b are arranged in an X-shape in pair. For example, when the SMA 27a is heated and thereby shrinks, the imaging lens portion 3 is pulled in a left direction in FIG. 9, and when the SMA 27b shrinks, the imaging lens portion 3 is pulled in a right direction in FIG. 9. In this manner, the optical portion 31 moves relatively with respect to the image sensor 18, so that optical image stabilization is enabled.

Note that, another pair of the SMAs 27a and 27b may be arranged on a surface of the image stabilization portion 4, which is opposite to a surface illustrated in FIG. 9 (that is, on a not-illustrated surface which is positioned on a rear surface side of FIG. 9). By providing two pairs of the SMAs 27a and 27b to successfully maintain balance of a force applied to the imaging lens portion 3, it becomes possible to linearly displace the imaging lens portion 3 in a right-and-left direction (X direction) in FIG. 9.

In addition, in order to displace the imaging lens portion 3 in a Y direction (that is, in FIG. 9, a direction perpendicular to a paper surface) among two directions (in FIG. 9, the X direction and the Y direction) which are perpendicular to the optical axis direction (Z direction in FIG. 9), the SMAs 27c and 27d which are arranged on surfaces of the image stabilization portion 4, which are different, by 90 degrees, from surfaces on which the SMAs 27a and 27b are provided, may be used.

As described above, similarly to the SMAs 27a and 27b, the SMAs 27c and 27d are SMA wires (SMA elements) each of which is formed in a wire shape. Similarly to the SMAs 27a and 27b, one end part of each of the SMAs 27c and 27d is installed in the OIS movable plate 12 and the other end part is installed in the OIS base 14 so that the SMAs 27c and 27d are arranged in an X-shape in pair, as well.

Note that, also as to the SMAs 27c and 27d, one pair may be arranged on each of surfaces of the image stabilization portion 4, which are opposed to each other, that is, two pairs may be arranged in total. By providing two pairs of the SMAs 27c and 27d to successfully maintain balance of the force applied to the imaging lens portion 3, it becomes possible to linearly displace the imaging lens portion 3 in the Y direction.

Effect

As above, according to the present embodiment, it is possible to easily remove the shape memory alloys 27a to 27d from the OIS movable plate 12 and the OIS base 14. Therefore, it is possible to appropriately change only the OIS driving mechanism adopted in the image stabilization portion 4 without changing the AF driving mechanism adopted in the imaging lens portion 3. Moreover, in the case of using the SMAs 27a to 27d as the OIS driving portion, it is possible to obtain a great driving force with smaller power compared with the case of using the VCM.

SUMMARY

A camera module (50) according to an aspect 1 of the invention includes:

an imaging lens portion (3) having imaging lenses (1) and an autofocus driving portion (an AF coil 9 and an AF magnet 10) which drives the imaging lenses in an optical axis direction;

an imaging portion (5) having an image sensor (18); and an image stabilization portion (4) having an opening (openings 12a and 14a) which faces the image sensor and moving the imaging lens portion in a plane perpendicular to the optical axis direction in a state where the imaging lenses face the image sensor, in which the image stabilization portion includes a movable part (for example, an OIS movable plate 12, an OIS movable plate and AF base 23, or an OIS magnet 13) on which the imaging lens portion is mounted, a fixed part (for example, an OIS base 14 or a magnet body 26) which is provided closer to the imaging portion than the movable part and does not change a position thereof at a time of image stabilization, and a guide member having a spherical shape (guide balls 15), which is provided between the movable part and the fixed part and supports the movable part so as to be movable in a plane perpendicular to the optical axis direction with respect to the fixed part.

According to the aforementioned configuration, since the imaging lens portion itself, which has the imaging lenses and the autofocus driving portion, moves integrally with the movable part in a direction perpendicular to the optical axis direction, it is possible to move an entire of a lens group in the direction perpendicular to the optical axis direction. Additionally, it is not necessary to separately arrange an image stabilization device which moves a lens, other than the imaging lenses, or an image sensor, each of which is driven for autofocus, in the direction perpendicular to the optical axis direction. It is therefore possible to perform thinning of the camera module.

Moreover, according to the aforementioned configuration, since the entire of the lens group is moved in the plane perpendicular to the optical axis direction, a problem that deviation is caused between center positions of the lenses and an optical characteristic is deteriorated is not caused. Thus, according to the aforementioned configuration, it is possible to provide the camera module which has an excellent optical characteristic.

Further, the imaging lens portion and the movable part are only supported by the spherical guide member, and the imaging lens portion and a driving mechanism for making the movable part movable are not connected directly. Thus, it is not necessary to provide a mechanism or a space for installing a member, which directly connects the imaging lens portion and the driving mechanism, in an outside of the imaging lenses or the like, so that it is possible to miniaturize the camera module. In addition, since it is easy to separate the imaging lens portion and the movable part, any lens portion may be used for the imaging lens portion, thus making it possible to achieve both of miniaturization and thinning regardless of a structure of the imaging lens portion.

A camera module (50) according to an aspect 2 of the invention includes:

an imaging lens portion (3) having imaging lenses (1);

an imaging portion (5) having an image sensor (18); and an image stabilization portion (4) having an opening (openings 12a and 14a) which faces the image sensor and moving the imaging lens portion in a plane perpendicular to an optical axis direction in a state where the imaging lenses face the image sensor, in which the imaging lens portion, the image stabilization portion, and the imaging portion are arranged in a stacked manner in the camera module, and the image stabilization portion includes a movable part (for example, an OIS movable plate 12, an OIS movable plate and AF base 23, a lens holder 24 which functions also as the OIS movable plate 12, or an OIS magnet 13) on which the imaging lens portion is mounted, a fixed part (for example, an OIS base 14 or a magnet body 26) which is mounted on the imaging portion and does not change a position thereof at a time of image stabilization, and a guide member having a spherical shape (guide balls 15), which is provided between the movable part and the fixed part and supports the movable part so as to be movable in a plane perpendicular to the optical axis direction with respect to the fixed part.

According to the aforementioned configuration, since the imaging lens portion itself moves integrally with the movable part in a direction perpendicular to the optical axis direction, it is possible to move an entire of a lens group in the direction perpendicular to the optical axis direction. Additionally, it is not necessary to separately arrange an image stabilization device which moves a lens or an image sensor in the direction perpendicular to the optical axis direction. It is therefore possible to perform thinning of the camera module.

Moreover, according to the aforementioned configuration, since the entire of the lens group is moved in the plane perpendicular to the optical axis direction, a problem that deviation is caused between center positions of the lenses and an optical characteristic is deteriorated is not caused. Thus, according to the aforementioned configuration, it is possible to provide the camera module which has an excellent optical characteristic.

Further, the imaging lens portion and the movable part are only supported by the spherical guide member, and the imaging lens portion and a driving mechanism for making the movable part movable are not connected directly. Thus, it is not necessary to provide a mechanism or a space for installing a member, which directly connects the imaging lens portion and the driving mechanism, in an outside of the imaging lenses or the like, so that it is possible to miniaturize the camera module. In addition, since it is easy to separate the imaging lens portion and the movable part, any lens portion may be used for the imaging lens portion, thus making it possible to achieve both of miniaturization and thinning regardless of a structure of the imaging lens portion.

Moreover, since the imaging lens portion, the image stabilization portion, and the imaging portion are arranged in the stacked manner, a part of a configuration in an interface between respective layers (that is, the imaging lens portion, the image stabilization portion, and the imaging portion) is able to be made common to be used, and the respective layers are able to be arranged independently. By adopting such a stacked arrangement structure, it becomes possible to constitute the imaging lens portion, the image stabilization portion, and the imaging portion in various combinations.

In addition, since the fixed part is mounted on the imaging portion, a position thereof is not changed with respect to the imaging portion in any case including a time of image stabilization. In this manner, by providing the fixed part, which does not change the position thereof, in the image stabilization portion and providing the imaging lens portion, the image stabilization portion, and the imaging portion separately, it is possible to constitute each of the imaging lens portion, the image stabilization portion, and the imaging portion independently. This makes it possible to constitute the imaging lens portion, the image stabilization portion, and the imaging portion in various combinations.

Further, according to the aforementioned configuration, also in a camera module adopting a fixed focus system, it is possible to move the entire of the lens group in the direction perpendicular to the optical axis direction, and it is not necessary to separately arrange an image stabilization device which moves a lens or an image sensor in the direction perpendicular to the optical axis direction. Thus, it is also possible to realize thinning of the camera module adopting the fixed focus system.

Moreover, it is possible to realize a camera module which has an excellent optical characteristic and a miniaturized camera module also in the case of adopting the fixed focus system.

A camera module (50) according to an aspect 3 of the invention may have a configuration in which, in the aspect 1 or 2, the imaging lens portion (3) includes a lens barrel (2) which holds the imaging lenses (1), and a part of the lens barrel is arranged inside the opening (at least one of the openings 12a and 14a).

According to the aforementioned configuration, it is possible to suppress a thickness of the camera module by a thickness of the part of the lens barrel, which is inserted into the opening, thus making it possible to effectively use a space corresponding to the inserted part of the lens barrel. Thus, it is possible to perform further thinning of the camera module.

A camera module (50) according to an aspect 4 of the invention may have a configuration in which, in the aspect 3, the imaging lens portion (3) includes a lens holder (24) which holds the lens barrel (2), and the lens barrel is fixed to the lens holder at initial positions of the imaging lenses (1) in the optical axis direction with respect to the image sensor (18).

According to the aforementioned configuration, it is possible to perform positional adjustment of the lens barrel in the optical axis direction freely to a certain degree within a range of a length of the lens holder in the optical axis direction. It is therefore possible to easily and precisely set the initial positions of the imaging lenses in the optical axis direction with respect to the image sensor in a camera module with an image stabilizer function, which achieves both of miniaturization and thinning.

In a camera module (50) according to an aspect 5 of the invention, in any of the aspects 1 to 4, the movable part (for example, the OIS movable plate 12 or the lens holder 24 which functions also as the OIS movable plate 12) may constitute a part of the imaging lens portion (3).

According to the aforementioned configuration, since the movable part and the part of the imaging lens portion are made common, it is possible to reduce the number of parts. Moreover, it is not necessary to secure a space in which the movable part is arranged, so that it is possible to perform further thinning of the camera module.

A camera module (50) according to an aspect 6 of the invention may have a configuration in which, in any of the aspects 1 to 5, the image stabilization portion (4) includes an image stabilization driving portion (for example, OIS magnets 13 and OIS coils 16, or SMAs 27a, 27b, 27c, and 27d) which drives the imaging lens portion (3) in the plane perpendicular to the optical axis direction.

According to the aforementioned configuration, it is possible to realize a camera module with an image stabilizer function, which achieves both of miniaturization and thinning, for various lens units each having an OIS driving mechanism.

In a camera module (50) according to an aspect 7 of the invention, in the aspect 2, the imaging lenses (1) may be fixed focus lenses.

Conventionally, an image stabilizer function is assumed to be included in an autofocus camera module, so that, according to the aforementioned configuration, it is possible to realize a camera module having a new structure, which is a camera module with an image stabilizer function, which has imaging lenses of a fixed focus system.

In addition, since an autofocus driving portion is not required, it is possible to simplify a configuration of the imaging lens portion in the direction perpendicular to the optical axis direction. Accordingly, it is possible to attain further miniaturization of the camera module.

In a camera module (50) according to an aspect 8 of the invention, in any of the aspects 1 to 7, the fixed part (for example, the OIS base 14) may constitute a part of the imaging portion (5).

According to the aforementioned configuration, since the fixed part and the part of the imaging portion are made common, it is possible to reduce the number of parts. Moreover, it is not necessary to secure a space in which the fixed part is arranged, so that it is possible to perform further thinning of the camera module.

A camera module (50) according to an aspect 9 of the invention may have a configuration in which, in any of the aspects 1 to 8, the movable part (for example, the OIS movable plate 12 or the OIS movable plate and AF base 23) includes permanent magnets (OIS magnets 13) which drive the movable part with an electromagnetic force which acts between the permanent magnets and coils (OIS coils 16) provided in the fixed part (for example, the OIS base 14), and the fixed part includes a magnetic body (26), which urges the guide member (guide balls 15) in the optical axis direction with an attraction force acting between the magnetic body and the permanent magnets, in a part which is in contact with the guide member.

According to the aforementioned configuration, since the guide member does not float, it is possible to smoothly move the imaging lens portion and the movable part in the plane perpendicular to the optical axis direction. Further, since the coils and the guide member are not directly in contact with each other, it is possible to prevent the coils from being damaged.

The invention is not limited to each of the embodiments described above, and may be modified in various manners within the scope of the claims and an embodiment achieved by appropriately combining technical means disclosed in each of different embodiments is also encompassed in the technical scope of the invention. Further, by combining the technical means disclosed in each of the embodiments, a new technical feature may be formed.

INDUSTRIAL APPLICABILITY

The invention is able to be used for a camera module, and, particularly, is able to be used suitably for a camera module to be mounted on various electronic equipment including communication equipment such as a mobile terminal.

REFERENCE SIGNS LIST 1 imaging lens
2 lens barrel 2a protrusion
3 imaging lens portion
4 image stabilization portion
5 imaging portion
6 cover
7, 8 plate spring
9 AF coil (autofocus driving portion)
10 AF magnet (autofocus driving portion)
11 AF base
12 OIS movable plate (movable part)
12a opening
13 OIS magnet (permanent magnet, movable part, image stabilization driving portion)
14 OIS base (fixed part)
14a opening
15 guide ball (guide member)
16 OIS coil (coil, image stabilization driving portion)
17 hall element
18 image sensor
19 substrate
20 sensor cover
20a opening
20b protrusion
21 glass substrate
22 adhesive
23 OIS movable plate and AF base (movable part)
23a opening
23b recess
24 lens holder
24a protrusion
25 adhesive
26 magnet body (magnet body, fixed part)
27a SMA (image stabilization driving portion)
27b SMA (image stabilization driving portion)
27c shape memory alloy
27d shape memory alloy
31 optical portion
50 camera module

The invention claimed is:

1. A camera module, comprising:
an imaging lens portion having imaging lenses and an autofocus driving portion which drives the imaging lenses in an optical axis direction;
an imaging portion having an image sensor; and
an image stabilization portion having an opening which faces the image sensor and moving the imaging lens portion in a plane perpendicular to the optical axis direction in a state where the imaging lenses face the image sensor,
wherein:
the image stabilization portion includes
a movable part on which the imaging lens portion is mounted,
a fixed part which is provided closer to the imaging portion than the movable part and does not change a position thereof at a time of image stabilization, and
a guide member having a spherical shape, which is provided between the movable part and the fixed part and supports the movable part so as to be movable in a plane perpendicular to the optical axis direction with respect to the fixed part;
the movable part includes permanent magnets which drive the movable part with an electromagnetic force which acts between the permanent magnets and coils provided in the fixed part; and
the fixed part includes a magnetic body, which urges the guide member in the optical axis direction with an attraction force acting between the magnetic body and the permanent magnets, in a part which is in contact with the guide member.

2. A camera module, comprising:
an imaging lens portion having imaging lenses;
an imaging portion having an image sensor; and
an image stabilization portion having an opening which faces the image sensor and moving the imaging lens portion in a plane perpendicular to an optical axis direction in a state where the imaging lenses face the image sensor,
wherein:
the imaging lens portion, the image stabilization portion, and the imaging portion are arranged in a stacked manner in the camera module;
the image stabilization portion includes
a movable part on which the imaging lens portion is mounted,
a fixed part which is mounted on the imaging portion and does not change a position thereof at a time of image stabilization, and
a guide member having a spherical shape, which is provided between the movable part and the fixed part and supports the movable part so as to be movable in a plane perpendicular to the optical axis direction with respect to the fixed part;
the movable part includes permanent magnets which drive the movable part with an electromagnetic force which acts between the permanent magnets and coils provided in the fixed part; and
the fixed part includes a magnetic body, which urges the guide member in the optical axis direction with an attraction force acting between the magnetic body and the permanent magnets, in a part which is in contact with the guide member.

3. The camera module according to claim 1, wherein the imaging lens portion includes a lens barrel which holds the imaging lenses, and
a part of the lens barrel is arranged inside the opening.

4. The camera module according to claim 1, wherein a part of the movable part constitutes a part of the imaging lens portion.

5. The camera module according to claim 1, wherein the image stabilization portion includes an image stabilization driving portion which drives the imaging lens portion in the plane perpendicular to the optical axis direction.

6. The camera module according to claim 1, wherein the fixed part constitutes a part of the imaging portion.

* * * * *